United States Patent
Yuille et al.

(10) Patent No.: US 12,125,211 B2
(45) Date of Patent: *Oct. 22, 2024

(54) SYSTEM AND METHOD FOR MULTI-SCALE COARSE-TO-FINE SEGMENTATION OF IMAGES TO DETECT PANCREATIC DUCTAL ADENOCARCINOMA

(71) Applicant: The Johns Hopkins University, Baltimore, MD (US)

(72) Inventors: Alan Yuille, Baltimore, MD (US); Elliott Fishman, Owings Mills, MD (US); Zhuotun Zhu, Baltimore, MD (US); Yingda Xia, Baltimore, MD (US); Lingxi Xie, Beijing (CN)

(73) Assignee: The Johns Hopkins University, Baltimore, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/696,553

(22) Filed: Mar. 16, 2022

(65) Prior Publication Data
US 2022/0277459 A1    Sep. 1, 2022

Related U.S. Application Data

(63) Continuation of application No. 16/924,954, filed on Jul. 9, 2020, now Pat. No. 11,308,623.

(Continued)

(51) Int. Cl.
*G06T 7/11* (2017.01)
*G06T 7/00* (2017.01)

(52) U.S. Cl.
CPC .............. *G06T 7/11* (2017.01); *G06T 7/0012* (2013.01); *G06T 2207/10072* (2013.01);
(Continued)

(58) Field of Classification Search
CPC ..................... G06T 7/11; G06T 7/0012; G06T 2207/10072; G06T 2207/20081;
(Continued)

(56) References Cited

U.S. PATENT DOCUMENTS 9,739,783 B1    8/2017 Kumar et al.
9,811,906 B1    11/2017 Vizitiu et al.
(Continued)

FOREIGN PATENT DOCUMENTS

CN    109685809 A  *  4/2019 ............. A61B 6/032
EP    3252671        5/2016
(Continued)

OTHER PUBLICATIONS

English Translation of CN 109685809 A (Year: 2019).*
(Continued)

*Primary Examiner* — Jon Chang
(74) *Attorney, Agent, or Firm* — Fish & Richardson P.C.

(57) ABSTRACT

Methods, systems, apparatus, and computer programs, for processing images through multiple neural networks that are trained to detect a pancreatic ductal adenocarcinoma. In one aspect, a method includes actions of obtaining a first image that depicts a first volume of voxels, performing coarse segmentation of the first image using a first neural network trained (i) to process images having the first volume of voxels and (ii) to produce first output data, determining a region of interest of the first image based on the coarse segmentation, performing multi-stage fine segmentation on a plurality of other images that are each based on the region of interest of the first image to generate output data for each stage of the multi-stage fine segmentation, and determining based on the first output data and the output data of each stage of the multi-stage fine segmentation, whether the first image depicts a tumor.

18 Claims, 4 Drawing Sheets

Related U.S. Application Data

(60) Provisional application No. 62/872,113, filed on Jul. 9, 2019.

(52) U.S. Cl.
CPC ............... *G06T 2207/20081* (2013.01); *G06T 2207/20084* (2013.01); *G06T 2207/30096* (2013.01)

(58) Field of Classification Search
CPC . G06T 2207/20084; G06T 2207/30096; G06T 2207/10081
See application file for complete search history.

(56) References Cited

U.S. PATENT DOCUMENTS

| | | | |
|---|---|---|---|
| 9,947,102 | B2 | 4/2018 | Xu et al. |
| 9,965,863 | B2 | 5/2018 | Xu et al. |
| 10,140,544 | B1 | 11/2018 | Zhao et al. |
| 11,049,250 | B2 | 6/2021 | Nye et al. |
| 11,308,623 | B2 | 4/2022 | Yuille et al. |
| 2010/0067754 | A1 | 3/2010 | Collins et al. |
| 2012/0230572 | A1 | 9/2012 | Kohlberger |
| 2015/0003703 | A1* | 1/2015 | Franz .................. G06T 7/174 382/128 |
| 2016/0098833 | A1 | 4/2016 | Tsadok et al. |
| 2017/0249744 | A1 | 8/2017 | Wang et al. |
| 2018/0042565 | A1 | 2/2018 | Wilson et al. |
| 2018/0108124 | A1 | 4/2018 | Guo et al. |
| 2019/0220975 | A1 | 7/2019 | Hsieh et al. |
| 2019/0258878 | A1 | 8/2019 | Koivisto et al. |
| 2020/0202507 | A1 | 6/2020 | Ceccaldi et al. |
| 2020/0245960 | A1 | 8/2020 | Richter et al. |
| 2020/0278681 | A1 | 9/2020 | Gier et al. |
| 2020/0342600 | A1 | 10/2020 | Sjostrand et al. |
| 2020/0356899 | A1 | 11/2020 | Rejeb Sfar et al. |
| 2020/0372626 | A1 | 11/2020 | Dal Mutto et al. |
| 2021/0012505 | A1 | 1/2021 | Yuille et al. |
| 2022/0215646 | A1 | 7/2022 | Park et al. |
| 2022/0392641 | A1 | 12/2022 | Yuille et al. |

FOREIGN PATENT DOCUMENTS

| | | |
|---|---|---|
| EP | 3392832 | 10/2018 |
| WO | WO 2016/182551 | 11/2016 |
| WO | WO 2017/210690 | 12/2017 |
| WO | WO 2018/015080 | 1/2018 |
| WO | WO 2018/015414 | 1/2018 |
| WO | WO 2019/005722 | 1/2019 |

OTHER PUBLICATIONS

Hu et al. "Brain Tumor Segmentation Using Multi-Cascaded Convolutional Neural Networks and Conditional Random Field." IEEE Access, vol. 7, Jul. 8, 2019, pp. 92615-92629 (Year: 2019).*
International Preliminary Report on Patentability in Appl. No. PCT/US2020/029631, dated Sep. 28, 2021, 6 pages.
International Preliminary Report on Patentability in International Application No. PCT/US2020/060061, mailed on May 27, 2022, 9 pages.
International Search Report and Written Opinion in International Application No. PCT/US2020/060061, mailed on Mar. 1, 2021, 14 pages.
International Search Report in Appl. No. PCT/US2020029631, dated Jul. 30, 2020, 6 pages.
Kortylewski et al., "Compositional Convolutional Neural Networks: A Deep Architecture with Innate Robustness to Partial Occlusion," arXiv:2003.04490v3, Apr. 2020, 10 pages.
Roth et al., "Hierarchical 3D fully convolutional networks for multi-organ segmentation," ARXIV., Apr. 2017, arXiv:1704.06382:11 pages.
Wang et al., "Image Quality Assessment: From Error Visibility to Structural Similarity," IEEE Transactions on Image Processing, Apr. 2004, 13:4:600-612.
Wang et al., "Robust Object Detection under Occlusion with Context-Aware CompositionalNets," 2020 IEEE/CVF Conference on Computer Vision and Pattern Recognition (CVPR), Jun. 2020, pp. 12642-12651.
Yuille et al., "Abdominal multi-organ segmentation with organ-attention networks and statistical fusion," Med., Image Anal., Jul. 2019, 55:88-102.
Abraham et al., "Extracting Brain Regions from Rest fMRI with Total-Variation Constrained Dictionary Learning," MICCAI., 2013, 16:2:607-15.
Ansari et al. "Role of Magnetic Resonance Imaging in the Detection and Characterization of Solid Pancreatic Nodules: An Update." World Journal of Radiology, 28, 7(11), Nov. 2015, 361-374.
Asman et al., " Formulating spatially varying performance in the statistical fusion framework," IEEE Trans. On Med, Imaging, 2012, 31:6:1326-1336.
Asman et al., "Non-local statistical label fusion for multi-atlas segmentation," Med. Image Anal., Feb. 2013, 17:2:194-208.
Aydogan et al., "Analysis of Trabecular Bone Microstructure Using Contour Tree Connectivity," Miccai., 2013, 16:2:428-35.
Bieth et al., "Atlas Construction for Dynamic (4D) PET Using Diffeomorphic Transformations," Miccai, 2013, 35-42.
Boykov et al., "Fast approximate energy minimization via graph cuts," IEEE Transactions on PAMI, 2001, 23:11:122-1239.
Brosch et al., "Manifold Learning of Brain MRIs by Deep Learning," Miccai., 2013, 16:2:633-40.
Cerrolaza et al., "Multiresolution Hierarchical Shape Models in 3D Subcortical Brain Structures," Miccai., 2013, 16:2:641-8.
Chang et al., "Characterization of Tissue Histopathology via Predictive Sparse Decomposition and Spatial Pyramid Matching, " Miccai., 2013 8150:91-98.
Chatelain et al., "Learning from Multiple Experts with Random Forests: Application to the Segmentation of the Midbrain in 3D Ultrasound," Miccai, 2013, 16:2:230-7.
Chen et al., "VoxResNet:Deep voxelwise residual networks for brain segmentation from 3D mr images," NeuroImage, 2018, 170:446-455.
Chen et al., "Attention to scale: Scale-aware semantic image segmentation," In proceedings of the IEEE conf. on CCVPR, 2016, 3640-3649.
Chen et al., "DeepLab: Semantic Image Segmentation with Deep Convolutional Nets, Atrous Convolution, and Fully Connected CRFs", IEEE Transactions on Pattern Analysis and Machine Intelligence, 2016, 40(4): 834-848.
Chu et al., " Multi-organ segmentation based on spatially-divided probabilistic atlas from 3D abdominal CT images," Lecture Notes in Comp. Sci., 2013, 8150LNCS(part 2) 165-172.
Ciompi et al., "Stent Shape Estimation through a Comprehensive Interpretation of Intravascular Ultrasound Images," Miccai., 2013, 16:2:345-52.
Ciresan et al., "Mitosis Detection in Breast Cancer Histology Images with Deep Neural Networks," Miccai., 2013, 16:2:411-8.
Cisek et al., "3D U-Net: Learning dense volumetric segmentation from sparse annotation," Miccai, 2016, 424-432.
Cruz-Roa et al., "A Deep Learning Architecture for Image Representation, Visual Interpretability and Automated Basal-Cell Carcinoma Cancer Detection," Miccai., 2013, 16:2:403-10.
Da Mota et al., "Enhancing the Reproducibility of Group Analysis with Randomized Brain Parcellations," Miccai., 2013, 16:2:591-8.
Datar et al., "Geodesic Distances to Landmarks for Dense Correspondence on Ensembles of Complex Shapes," Miccai., 2013, 16:19-26.
De Silva et al., "Improving 2D-3D Registration Optimization Using Learned Prostate Motion Data," Miccai, 2013, 16:2:124-31.
Dinse et al., "A Histology-Based Model of Quantitative T1 Contrast for In-vivo Cortical Parcellation of High-Resolution 7 Tesla Brain MR Images,".
Dou et al., "3D deeply supervised network for automatic liver segmentation from CT volumes," Med. Image Analysis, Oct. 2017, 41:40-54.

(56) References Cited

OTHER PUBLICATIONS

Dou et al., "Multilevel Contextual 3-D CNNs for False Positive Reduction in Pulmonary Nodule Detection", IEEE TBE, 2017, 64(7): 1558-1567.
Durichen et al., "Respiratory Motion Compensation with Relevance Vector Machines," Miccai., 2013, 108-115.
Everingham et al., The Pascal visual object classes challenge 2012 (VOC2012) results. 2012, Pascal2, 24 pages.
Farag et al., "Automatic pancreas segmentation using coarse to-fine superpixel labeling," Deep learning ans Convutional Neural Networks for Medical Computing, 2017.
Forman et al., "Free-Breathing Whole-Heart Coronary MRA: Motion Compensation Integrated into 3D Cartesian Compressed Sensing Reconstruction, " Miccai., 2013, 16:2:575-82.
Gao et al., Incremental Learning with Selective Memory (ILSM): Towards Fast Prostate Localization for Image Guided Radiotherapy, Miccai., 2013, 16:2:378-386.
Gibson et al.,"Automatic multi-organ segmentation on abdominal CT with dense V-networks," IEEE Trans. Med. Imaging, Aug. 2018, 37:8:1822-1834.
Ginsburg et al., "Variable Importance in Nonlinear Kernels (VINK): Classification of Digitized Histopathology," Miccai., 2013, 16:2:238-45.
Glocker et al., "Vertebrae Localization in Pathological Spine CT via Dense Classification from Sparse Annotations," Miccai., 2013, 16:2:262-70.
Gomez et al., "3D Intraventricular Flow Mapping from Colour Doppler Images and Wall Motion, " Miccai,2013, 16:2:476-83.
Grbic et al., "Image-Based Computational Models for TAVI Planning: From CT Images to Implant Deployment," Miccai., 2013, 16:2:395-402.
Hacihaliloglu eet al., "Statistical Shape Model to 3D Ultrasound Registration for Spine Interventions Using Enhanced Local Phase Features," Miccai., 2013, 16:2:361-8.
Hamy et al., "Respiratory Motion Correction in Dynamic-MRI: Application to Small Bowel Motility Quantification during Free Breathing," Miccai, 2013, 16:2:132-40.
Havaei et al.," Brain tumor segmenation with deep neural networks," Medical Image analysis, Jan. 2017, 35:18-31.
He et al., "Deep Residual Learning for Image Recognition", 2016, CVPR, 770-778.
Heimann et al., "Comparison and evaluation of methods for live segmentation from CT datasets," IEEE Transactions on Medical Imaging, Aug. 2009, 28:8.
Hibar er al., "Genetic Clustering on the Hippocampal Surface for Genome-Wide Association Studies," Miccai., 2013, 16:2:690-7.
Hu et al., "Automated Separation of Binary Overlapping Trees in Low-Contrast Color Retinal Images," Miccai., 2013, 16:2:436-43.
Huang et al., "A New Sparse Simplex Model for Brain Anatomical and Genetic Network Analysis," Miccai., 2013, 16:2:625-632.
Huh et al, "Apoptosis Detection for Non-adherent Cells in Time-lapse Phase Contrast Microscopy, "Miccai, 2013, 8150: 59-66.
Hussein et al., "Lung and Pancreatic Tumor Characterization in the Deep Learning Era: Novel Supervised and Unsupervised Learning Approaches", IEEE Transactions on Medical Imaging, 2019, 38(8): 1777-1787.
Hussein et al., "Supervised and unsupervised tumor characterization in the deep learning era," ArXiv, 2018,.
Iglesias et al., Multi-atlas segmentation of biomedical images: A survey, Med Image Anal., Aug. 2015, 24:1:205-219.
Imani et al., "Ultrasound-Based Characterization of Prostate Cancer: An in vivo Clinical Feasibility Study," Micaai, 2013, 16:2:279-86.
Jiang et al., "Predictive Models of Resting State Networks for Assessment of Altered Functional Connectivity in MCI," Miccai., 2013, 16:2:674-81.
Jimenez del Toro et al., "Epileptogenic Lesion Quantification in MRI Using Contralateral 3D Texture Comparisons," Miccai., 2013, 16:2:353-60.
Kamnitsas et al., "Effcient multi-scale 3D Cnn with fully connected CRF for accurate brain lesion segmentation," Med. Image Analysis, Feb. 2017, 36:61-78.
Kannnitsas et al. "Efficient Multi-Scale 3D CNN with Fully Connected CRF for Accurate Brain Lesion Segmentation." Medical Image Analysis vol. 36, Feb. 2017, pp. 61-78 (Year: 2017).
Karasawa e al., "Multi-atlas pancreas segmentation: Atlas selection based on vessel structure," Med. Image Analysis, 2017, 39:18-28.
Kirbas et al., "A review of vessel extraction techniques and algorithms," ACM Computing Surveys, 2004, 36:2:81-121.
Koenig et al., "The Spatial Periodicity of Grid Cells Is Not Sustained During Reduced Theta Oscillations," Science, 2011, 332:592-595.
Kong et al., "RON: Reverse connection with objectness prior networks for object detection," IEEE Conference on Computer Vision Pattern Recognition.
Krizkevsky et al., "ImageNet Classification with Deep Convolutional Neural Networks", NIPS, 9 pages, 2012.
Kroeger et al., "Learning to Segment Neurons with Non-local Quality Measures, " MICCAI., 2013, 16:2:419-27.
Kronman et al., "Image Segmentation Errors Correction by Mesh Segmentation and Deformation," Miccai., 2013, 206-213.
Kwitt et al., "Studying Cerebral Vasculature Using Structure Proximity and Graph Kernels," Miccai., 2013, 16:2:534-541.
Lesage et al., "A review of 3D vessel lumen segmentation techniques: Models, features and extraction schemes," SciDirect., 2009, 13:819-845.
Li et al., "Automatic liver segmentation based shape constraints and deformable graph cut in CT images," IEEE tans. On Image Proc., Dec. 2015, 24:12.
Liao et al., "Representation Learning: A Unified Deep Learning Framework for Automatic Prostate MR Segmentation," Miccai., 2013, 16:2:254-61.
Lindner et al., "Accurate Bone Segmentation in 2D Radiographs Using Fully Automatic Shape Model Matching Based On Regression-Voting," Miccai., 2013, 181-189.
Liu et al., "Automatic pancreas segmentation via coarse location and ensemble learning, " IEEE Access, 2019, 9 pages.
Liu et al., "High-Order Graph Matching Based Feature Selection for Alzheimer's Disease Identification," Miccai., 2013, 16:2:311-318.
Liu et al., "A Variational Framework for Joint Detection and Segmentation of Ovarian Cancer Metastases," Miccai., 2013, 8150:83-90.
Liu et al., "Joint shape representation and classification for detecting PDAC," Mlmi@Miccai, 2019.
Liu et al., "Longitudinal Modeling of Glaucoma Progression Using 2-Dimensional Continuous-Time Hidden Markov Model," Miccai., 2013, 16:2:444-451.
Liu et al., "Multifold Bayesian Kernelization in Alzheimer's Diagnosis," Miccai., 2013, 16:2:303-10.
Liu et al., "Tracking of Carotid Arteries in Ultrasound Images," Miccai., 2013, 16:2:526-33.
Lombaert et al., "Joint Statistics on Cardiac Shape and Fiber Architecture," Miccai., 2013, 16:2:492-500.
Long et al., "Fully convulutional networks for semantic segmentation," IEE Trans. Pattern Anal Mach Intell., Apr. 2017, 39:4:640-651.
Lorenzi et al., "Sparse Scale-Space Decomposition of Volume Changes in Deformations Fields," Miccai., 2013, 16:2:328-35.
Lorza et al., "Carotid Artery Lumen Segmentation in 3D Free-Hand Ultrasound Images Using Surface Graph Cuts," Miccai., 2013, 16:2:542-9.
Lugo-Fagundo et al., "Deep learning in radiology: Now the real work begins," J. Am. Coll. Radiol., Feb. 2018, 15:2:364-367.
Lundervold et al. An Overview of Deep Learning in Medical Imaging Focusing on MRI. Z Med Phys vol. 29, issue 2, May 2019, pp. 102-127 (Year: 2019).
Lundervold et al., "An overview of deep learning in medical imaging focusing on MRI," Zeitschrift für Medizinische Physik, May 2019, 29:2:102-127.
Lv et al., "Group-Wise FMRI Activation Detection on Corresponding Cortical Landmarks," Miccai., 2013, 16:2:665-73.

(56) References Cited

OTHER PUBLICATIONS

Lv et al., "Modeling Dynamic Functional Information Flows on Large-Scale Brain Networks," Miccai., 2013, 698-705.
Mahapatra et al., "Semi-Supervised and Active Learning for Automatic Segmentation of Crohn's Disease," Miccai., 2013, 16:2:214-21.
Mahrooghy et al., "Heterogeneity Wavelet Kinetics from DCE-MRI for Classifying Gene Expression Based Breast Cancer Recurrence Risk, " Micca., 2013, 16:2:295-302.
Maier et al, "A gentle introduction to deep learning in medical imaging processing," J. of Med. Physics, Dec. 2018.
Marreiros et al., "Non-rigid Deformation Pipeline for Compensation of Superficial Brain Shift," Miccai., 2013, 16:2:141-8.
McLeod et al., "Spatio-temporal Dimension Reduction of Cardiac Motion for Group-Wise Analysis and Statistical Testing," Miccai., 2013, 16:2:501-8.
Melbourne et al., "Measurement of Myelin in the Preterm Brain: Multi-compartment Diffusion Imaging and Multi-component T2 Relaxometry," Miccai., 2013, 16:2:336-44.
Mharib et al., "Survey on liver CT image segmentation methods," Artif Intell rev., 2012, 37:83-95.
Milletari et al., "V-Net: Fully Convolutional Neural Networks for Volumetric Medical Image Segmentation", 2016 Fourth International Conference on 3D Vision,2016, 565-571.
Mori et al., Medical Image computing and computer-assisted intervention—Miccai 2013, 16th Int. Conf., Sep. 2013, 36 pages.
Nascimento et al., Multi-atlas segmentation using manifold learning with deep belief neworks, IEE, 2016, 4 pages.
NCBI.gov [online], "Pancreatic cancer treatment (adult) (PDQ)," May 15, 2020, retrieved on Oct. 5, 2020, retrieved from URL<https://www.ncbi.nlm.nih.gov/books/NBK65957/?report-printable. 37 pages.
Nouranian et al., "An Automatic Multi-atlas Segmentation of the Prostate in Transrectal Ultrasound Images Using Pairwise Atlas Shape Similarity," Miccai, 2013, 16:2:173-80.
Okada et al., "Abdominal multi-organ segmentation from CT images using conditional shape-location and unsupervised intensity priors," Med. Image Anal., Dec. 2015, 26:1:1-18.
Oktay et al., "Biomechanically driven registration of pre- to intraoperative 3D images for laparoscopic surgery," Miccai., 2013, 16:2:1-9.
Ospina et al., "A Tensor-Based Population Value Decomposition to Explain Rectal Toxicity after Prostate Cancer Radiotherapy," Miccai., 2013, 16:2:387-94.
Petersen et al., "Quantitative Airway Analysis in Longitudinal Studies Using Groupwise Registration and 4D Optimal Surfaces," Miccai., 2013, 16:2:287-94.
Piuze et al., "Cardiac Fiber Inpainting Using Cartan Forms," Miccai, 2013, 16:2:509-17.
Porras et al., "Myocardial Motion Estimation Combining Tissue Doppler and B-mode Echocardiographic Images," Miccai., 2013, 16:2:484-91.
Prasoon et al., "Deep Feature Learning for Knee Cartilage Segmentation Using a Triplanar Convolutional Neural Network," Miccai., 2013, 16:2:246-53.
Prevost et al., "Registration of Free-Breathing 3D+t Abdominal Perfusion CT Images via Co-segmentation," Miccai., 2013, 16:2:99-107.
Qiu et al., "Fast Globally Optimal Segmentation of 3D Prostate MRI with Axial Symmetry Prior," Miccai., 2013, 16:2:198-205.
Rafii-Tari et al., "Learning-Based Modeling of Endovascular Navigation for Collaborative Robotic Catheterization," Miccai., 2013, 16:2:369-77.
Rajchl et al., "Deepcut: Object segmentation from bounding box annotations using convulutional neural networks," IEEE Trans. Med. Imaging., 2016, 10 pages.
Romain et al., "A Multi-task Learning Approach for Compartmental Model Parameter Estimation in DCE-CT Sequences," Micaa., 2013, 16:2:271-8.
Ronneberger et al., "U-Net: Convolutional Networks for Biomedical Image Segmentation", Miccar, 234-241, 2015.
Roth et al., Spatial aggregation of holistically-nested convolutional neural networks for automated pancreas localization and segmentation, Medical Image Analysis, Apr. 2018, 45:94-107.
Roth et al., "Towards dense volumetric pancreas segmentation in CT using 3D fully conventional networks," Medical Imaging, 2018, 6 pages.
Roth et al., "Deep convulutional networks for pancreas segmentation in CT imaging," Medical imaging, 2015, 8 pages.
Roth et al., "DeepOrgan: Multi-level Deep Convolutional Networks for Automated Pancreas Segmentation", Miccai, 556-564, 2015.
Roth et al., "Spatial Aggregation of Holistically-Nested Networks for Automated Pancreas Segmentation", 2016, MICCAI, 451-459.
Sabuncu et al., "A generative model for image segmentation based on label fusion," IEE Trans. On Med. Imaging, Oct. 2010, 29:10:1714-1729.
Saito et al., "Joint optimization of segmentation and shape prior from level-set-based statistical shape model, and its application to the automated segmentation of abdominal organs," Med. Image Analysis, 2016, 28:46-65.
Seito et al., "Pulmonary nodule detection in CT images: False positive reduction using multi-view convolutional networks," IEEE Trans. On Med. Imag., May 2016, 35:5:1160-1169.
Shen et al., "A Spatial Mixture Approach to Inferring Sub-ROI Spatio-temporal Patterns from Rapid Event-Related fMRI Data," Miccai., 2013, 16:2:657-64.
Shen et al., Deep learning in medical image analysis, Annu rev. Biomed. En., 2017, 19:221-248.
Simpson et al., "A bayesian approach for spatially adaptive regularisation in Non-rigid registration," Miccai., 2013, 10-18.
Song et al., "Discriminative Data Transform for Image Feature Extraction and Classification," Miccai., 2013, 16:2:452-9.
Suk et al., "Deep Learning-Based Feature Representation for AD/MCI Classification," Miccai., 2013, 16:2:583-90.
Tang et al., "Random Walks with Efficient Search and Contextually Adapted Image Similarity for Deformable Registration," Miccai, 2013, 43-50.
Tong et al., "Multiple Instance Learning for Classification of Dementia in Brain MRI," Med. Image Anal., Jul. 2014, 18:5:808-18.
Uzunbas et al., "Collaborative Multi Organ Segmentation by Integrating Deformable and Graphical Models," Miccai, 2013, 157-164.
Vincent et al., "Bayesian Joint Detection-Estimation of Cerebral Vasoreactivity from ASL fMRI Data," Miccai, 2013, 616-624.
Wang et al., "Image quality assessment: Form error visibility to structural similarity," IEE. Trans. On Image. Proces., Apr. 2004, 13:4:600-612.
Wang et al., "Interactive Retinal Vessel Extraction by Integrating Vessel Tracing and Graph Search," Miccai., 2013, 16:2:567-74.
Wang et al., "Automated Embryo Stage Classification in Time-Lapse Microscopy Video of Early Human Embryo Development," Miccai., 2013, 16:2:460-7.
Wang et al., "Sequential Monte Carlo Tracking for Marginal Artery Segmentation on CT Angiography by Multiple Cue Fusion," Miccai., 2013, 16:2:518-525.
Wang et al.,"Abdominal multi-organ segmentation with organ-attention networks and statistical fusion," Medical Image Analysis, 2019, 55:88-102.
Warfield et al., "Simultaneous truth and performance level estimation (STAPLE): An algorithm for the validation of image segmentation," IEE Trans. Med. Imaging., Jul. 2004, 23:7:903-921.
Wasza et al., "Real-Time Respiratory Motion Analysis Using Manifold Ray Casting of Volumetrically Fused Multi-view Range Imaging," Miccai., 2013, 16:2:116-23.
Wee et al., "Identification of MCI Using Optimal Sparse MAR Modeled Effective Connectivity Networks," Miccai., 2013, 16:2:319-327.
Wolz et al., "Automated abdominal multi-organ segmentation with subject-specific atlas generation," IEE Trans. On Med. Imaging, Sep. 2013, 32:9:1723-1730.
Wu et al., "Unsupervised Deep Feature Learning for Deformable Registration of MR Brain Images," Miccai., 2013, 16:2:649-56.
Xia et al., "Bridging the Gap Between 2D and 3D Organ Segmentation with Volumetric Fusion Net", Miccai, 445-453, 2018.

(56) References Cited

OTHER PUBLICATIONS

Xie et al., "Holistically-Nested Edge Detection", Proceedings of the IEEE International Conference on Computer Vision, 2015, 1395-1403.
Xie et al., "Holistically-Nested Edge Detection," Int. J. of Comp. Vision, 2015, 125:3-18.
Xu et al., "A Symmetric 4D Registration Algorithm for Respiratory Motion Modeling," Miccai., 2013, 16:2:149-56.
Xu et al., "Automatic Grading of Nuclear Cataracts from Slit-Lamp Lens Images Using Group Sparsity Regression," Miccai., 2013, 16:2:468-75.
Xu et al., "Spatially Constrained Random Walk Approach for Accurate Estimation of Airway Wall Surfaces," Miccai., 2013, 16:2:559-566.
Ye et al., "Pathological Site Retargeting under Tissue Deformation Using Geometrical Association and Tracking," Miccai., 2013, 16:2:67-74.
Yokota et al., "Automated CT Segmentation of Diseased Hip Using Hierarchical and Conditional Statistical Shape Models," Miccai, 2013 190-197.
Yoldemir et al., "Overlapping Replicator Dynamics for Functional Subnetwork Identification," Miccai., 2013, 16:2:682-9.
Yu et al., "Recurrent saliency transformation network: incorporating multi-stage visual cues for small organ segmentation," Arxiv, 2017.
Zhang et al., "Large Deformation Diffeomorphic Registration of Diffusion-Weighted Images with Explicit Orientation Optimization,".
Zhang et al., "Personalized Pancreatic Tumor Growth Prediction via Group Learning", Miccai, 2017, 424-432.
Zhao et al., "Hierarchical Constrained Local Model Using ICA and Its Application to Down Syndrome Detection," Miccai., 2013, 16:2:222-9.
Zheng et al., "Optic disc and cup segmentation from color fundus photograph using graph cut with priors," Miccai., 2013, 16:75-82.
Zhou et al. "Pancreas Segmentation in Abdominal CT Scan: A Coarse-to-Fine Approach." arXiv:1612.08230v1, Dec. 2016, pp. 1-13.
Zhou et al., "A Fixed-Point Model for Pancreas Segmentation in Abdominal CT Scans", Miccai,2017, 693-701.
Zhou et al., "Deep Supervision for Pancreatic Cyst Segmentation in Abdominal CT Scans", Miccai, 2017, 222-230,.
Zhou et al., "Pancreas segmentation in abdominal CT scan: A coarse-to-fine approach," Arxiv, 2016.
Zhu et al., "A 3D Coarse-to-Fine Framework for Volumetric Medical Image Segmentation", International Conference on 3D Vision, 682-690, 2018.
Zhu et al., "Deep Learning Representation using Autoencoder for 3D Shape Retrieval", Neurocomputing 204: 41-50, 2016.
Zhu et al., "Multi-scale coarse-to-fine segmentation for screening pancreatic ductal adenocarcinoma," ArXiv, 2019.
Zhu et al., "Random Walks with Adaptive Cylinder Flux Based Connectivity for Vessel Segmentation," Miccai., 2013, 16:2:550-8.
Zhuang et al., Multi-scale patch and multi-modality atlases for whole heart segmentation of MRI, Med Image Analysis, 2016, 31:77-87.
Zu et al., "Robust multi-atlas propagation by deep sparse representation," Pattern Recognition, 2017, 63:511-517.
Extended Search Report in European Appln. No. 20794854.8, dated Apr. 19, 2023, 5 pages.
Wang et al., "Abdominal Multi-organ Segmentation with Organ-Attention Networks and Statistical Fusion," CoRR, submitted on Apr. 23, 2018, arXiv:1804.08414v1, 21 pages.
Arthur et al., "k-means++: The advantages of careful seeding," Proceedings of the Eighteenth Annual ACM-SIAM Symposium on Discrete Algorithms, Jan. 2007, 1027-1035.
Banerjee et al., "Clustering on the unit hypersphere using von mises-fisher distributions," Journal of Machine Learning Research, Sep. 2005, 6:1345-1382.

Bienenstock et al., "Compositionality, MDL Priors, and Object Recognition," Proceedings of the 9th International Conference on Neural Information Processing Systems, Dec. 1996, 838-844.
Cai et al., "Cascade R-CNN: Delving into High Quality Object Detection," Proceedings of the IEEE/CVF Conference on Computer Vision and Pattern Recognition (CVPR), Jun. 2018, 6154-6162.
Carlson et al., "A Sparse Object Coding Scheme in Area V4," Current Biology, Feb. 22, 2011, 21(4):288-293.
Dai et al., "Unsupervised learning of dictionaries of hierarchical compositional models," Proceedings of the IEEE Conference on Computer Vision and Pattern Recognition, Jun. 2014, 2505-2512.
Deng et al., "ImageNet: A Large-Scale Hierarchical Image Database," Proceedings of the IEEE Conference on Computer Vision and Pattern Recognition, Jun. 2009, 248-255.
DeVries et al., "Improved regularization of convolutional neural networks with cutout," CoRR, submitted on Nov. 29, 2017, arXiv:1708.04552v2, 8 pages.
Fawzi et al., "Measuring the effect of nuisance variables on classifiers," Proceedings of the British Machine Vision Conference (BMVC), Sep. 2016, 12 pages.
Fidler et al., "Learning a hierarchical compositional shape vocabulary for multiclass object representation," CoRR, submitted on Aug. 23, 2014, arXiv:1408.5516v1, 17 pages.
Fodor et al., "Connectionism and cognitive architecture: A critical analysis," Cognition, Mar. 1988, 28(1-2):3-71.
George et al., "A generative vision model that trains with high data efficiency and breaks text-based captchas," Science, Oct. 26, 2017, 358(6368):eaag2612, 19 pages.
Girshick et al., "Rich feature hierarchies for accurate object detection and semantic segmentation," Proceedings of the IEEE Conference on Computer Vision and Pattern Recognition (CVPR), Jun. 2014, 580-587.
Girshick, "Fast R-CNN," Proceedings of the IEEE International Conference on Computer Vision (ICCV), Dec. 2015, 1440-1448.
International Preliminary Report on Patentability in International Appln. No. PCT/US2022/033438, mailed on Dec. 28, 2023, 9 pages.
International Search Report and Written Opinion in International Appln. No. PCT/US2022/033438, mailed on Oct. 20, 2022, 10 pages.
Jin et al., "Context and hierarchy in a probabilistic image model," Proceedings of the 2006 IEEE Computer Society Conference on Computer Vision and Pattern Recognition (CVPR'06), Jun. 2006, 2145-2152.
Kingma et al., "Adam: A method for stochastic optimization," CoRR, submitted on Dec. 22, 2014, arXiv:1412.6980v1, 9 pages.
Kortylewski et al., "Greedy structure learning of hierarchical compositional models," CoRR, submitted on Jan. 22, 2017, arXiv:1701.06171v1, 16 pages.
Kortylewski et al., "Probabilistic compositional active basis models for robust pattern recognition," Proceedings of the British Machine Vision Conference (BMVC), Sep. 2016, 12 pages.
Kortylewski, "Model-based image analysis for forensic shoe print recognition," Dissertation for the Degree of Doctor of Philosophy, University of Basel, Jun. 2017, 124 pages.
Lampert et al., "Beyond sliding windows: Object localization by efficient subwindow search," IEEE Conference on Computer Vision and Pattern Recognition (CVPR), Jun. 2008, 8 pages.
Li et al., "AOGNets: Compositional Grammatical Architectures for Deep Learning," Proceedings of the IEEE/CVF Conference on Computer Vision and Pattern Recognition (CVPR), Jun. 2019, 6220-6230.
Li et al., "SymmNet: A Symmetric Convolutional Neural Network for Occlusion Detection," Proceedings of the British Machine Vision Conference (BMVC), Sep. 2018, 14 pages.
Liao et al., "Learning deep parsimonious representations," Advances in Neural Information Processing Systems, Dec. 2016, 29:5076-5084.
Lin et al., "Microsoft COCO: Common Objects in Context," Computer Vision—ECCV 2014 (LNCS), Sep. 2014, 8693:740-755.

(56) References Cited

OTHER PUBLICATIONS

Reddy et al., "Occlusion-Net: 2D/3D Occluded Keypoint Localization Using Graph Networks," Proceedings of the IEEE/CVF Conference on Computer Vision and Pattern Recognition (CVPR), Jun. 2019, 7326-7335.
Ren et al., "Faster R-CNN: Towards Real-Time Object Detection with Region Proposal Networks," Advances in Neural Information Processing Systems, Dec. 2015, vol. 28, 9 pages.
Roe et al., "Toward a Unified Theory of Visual Area V4," Neuron, Apr. 12, 2012, 74(1):12-29.
Sasikumar et al., "First-pass processing of value cues in the ventral visual pathway," Current Biology, Feb. 8, 2018, 28(4):538-548.
Simonyan et al., "Very deep convolutional networks for large-scale image recognition," CoRR, submitted on Dec. 23, 2014, arXiv:1409.1556v5, 13 pages.
Stone et al., "Teaching Compositionality to CNNs," Proceedings of the IEEE/CVF Conference on Computer Vision and Pattern Recognition (CVPR), Jul. 2017, 5058-5067.
Sun et al., "Symmetric stereo matching for occlusion handling," Proceedings of the IEEE Computer Society Conference on Computer Vision and Pattern Recognition (CVPR), Jun. 2005, 399-406.
Tabernik et al., "Towards deep compositional networks," Proceedings of the 23rd International Conference on Pattern Recognition (ICPR), Dec. 2016, 3470-3475.
Tang et al., "Deeply Learned Compositional Models for Human Pose Estimation," Computer Vision—ECCV 2018 (LNCS), Sep. 2018, 11207:190-206.
Tang et al., "Towards a unified compositional model for visual pattern modeling," Proceedings of the IEEE International Conference on Computer Vision (ICCV), Oct. 2017, 2784-2793.
The Handbook of Brain Theory and Neural Networks, 2nd ed., Arbib (ed.), 2003, pp. 244-248.
Vaziri et al., "A channel for 3d environmental shape in anterior inferotemporal cortex," Neuron, Oct. 2014, 84(1):55-62.
Wang et al., "Detecting semantic parts on partially occluded objects," Proceedings of the British Machine Vision Conference (BMVC), Sep. 2017, 13 pages.
Wang et al., "Discovering Internal Representations from Object-CNNs Using Population Encoding," CoRR, submitted on Nov. 21, 2015, arXiv:1511.06855v1, 12 pages.
Wang et al., "Visual concepts and compositional voting," CoRR, submitted on Nov. 13, 2017, arXiv:1711.04451v1, 37 pages.
Xiang et al., "Beyond Pascal: A benchmark for 3D object detection in the wild," IEEE Winter Conference on Applications of Computer Vision, Mar. 2014, 75-82.
Xiang et al., "Object Detection by 3D Aspectlets and Occlusion Reasoning," IEEE International Conference on Computer Vision Workshops, Dec. 2013, 530-537.
Xiao et al., "Tdapnet: Prototype network with recurrent top-down attention for robust object classification under partial occlusion," CoRR, submitted on Sep. 9, 2019, arXiv:1909,03879v1, 11 pages.
Yamane et al., "A neural code for three-dimensional object shape in macaque inferotemporal cortex," Nature Neuroscience, Oct. 5, 2008, 11(11):1352-1360.
Yan et al., "Inferring occluded features for fast object detection," Signal Processing, May 2015, 110:188-198.
Yun et al., "CutMix: Regularization Strategy to Train Strong Classifiers with Localizable Features," CoRR, submitted on May 13, 2019, arXiv:1905.04899v1, 14 pages.
Zhang et al., "Deepvoting: A robust and explainable deep network for semantic part detection under partial occlusion," Proceedings of the IEEE/CVF Conference on Computer Vision and Pattern Recognition (CVPR), Jun. 2018, 1372-1380.
Zhang et al., "Interpretable convolutional neural networks," Proceedings of the IEEE/CVF Conference on Computer Vision and Pattern Recognition (CVPR), Jun. 2018, 8827-8836.
Zhang et al., "Occlusion-aware R-CNN: Detecting Pedestrians in a Crowd," CoRR, submitted on Jul. 23, 2018, arXiv:1807.08407v1, 17 pages.
Zhu et al., "Robustness of Object Recognition under Extreme Occlusion in Humans and Computational Models," Proceedings of the 41st Annual Meeting of the Cognitive Science Society: Creativity + Cognition + Computation, Jul. 2019, 7 pages.
Zhu et al., "Unsupervised Structure Learning: Hierarchical Recursive Composition, Suspicious Coincidence and Competitive Exclusion," Computer Vision—ECCV 2008 (LNCS), Oct. 2008, 5303:759-773.
Kortylewski et al., "Compositional Convolutional Networks For Robust Object Classification under Occlusion," CoRR, submitted on May 29, 2019, arXiv: 1905.11826v2, 12 pages.

\* cited by examiner

SYSTEM AND METHOD FOR MULTI-SCALE COARSE-TO-FINE SEGMENTATION OF IMAGES TO DETECT PANCREATIC DUCTAL ADENOCARCINOMA

CROSS-REFERENCE TO RELATED APPLICATIONS

This application is a continuation of U.S. application Ser. No. 16/924,954 filed Jul. 9, 2020, which claims the benefit of U.S. Provisional Patent Application No. 62/872,113 filed Jul. 9, 2019, the entirety of which is incorporated herein by reference.

TECHNICAL FIELD

The present disclosure is directed towards cancer detection based on image analysis.

SUMMARY

According to one innovative aspect of the present disclosure, a data processing apparatus for processing images through a system of neural networks configured to detect a pancreatic ductal adenocarcinoma (PDAC) is disclosed. The data processing apparatus can include one or more processors and one or more computer readable storage media storing instructions, that when executed by the one or more processors, causes the one or more processors to perform operations. In one aspect, the operations can include obtaining a first image that depicts a first volume of voxels, performing coarse segmentation of the first image using a first neural network trained (i) to process images having the first volume of voxels and (ii) to produce first output data representing a first likelihood that the first image includes more than a threshold number of voxels that depict a tumor, determining a region of interest of the first image based on the coarse segmentation, performing multi-stage fine segmentation using a plurality of images that are each generated based on the region of interest of the first image, comprising: performing a first fine stage segmentation of a second image (i) including a second volume of voxels that is less than the first volume of voxels and (ii) generated based on the region of interest of the first image using a second neural network trained (i) to process images having the second volume of voxels and (ii) to produce second output data representing a second likelihood that the second image includes more than a threshold number of voxels that depict a tumor, and performing a second fine stage segmentation of a third image (i) including a third volume of voxels that is less than the second volume of voxels and (ii) generated based on the region of interest of the first image using a third neural network trained (i) to process images having the third volume of voxels and (ii) to produce third output data representing a third likelihood that the third image includes more than a threshold number of voxels that depict a tumor, and determining, based on the first output data, the second output data, and the third output data whether the obtained first image depicts a tumor.

Other versions include corresponding apparatuses, methods, and computer programs to perform the actions of methods defined by instructions encoded on computer readable storage devices.

These and other versions may optionally include one or more of the following features. For instance, in some implementations, the first image, the second image, and the third image are each CT images.

In some implementations, determining based on the first output data, the second output data, and the third output data whether the first image depicts a tumor can include determining average data that represents an average of the first likelihood, the second likelihood, and the third likelihood, and determining whether the average data satisfies a predetermined threshold.

In some implementations, the operations can further include: based on determining that the average data satisfies the predetermined threshold, determining that the first image depicts a tumor.

In some implementations, the operations can further include based on determining that the average data does not satisfy the predetermined threshold, determining that the first image does not depict a tumor.

In some implementations, the first volume of voxels can include a volume of $64^3$ voxels.

In some implementations, the second volume of voxels can include a volume of $32^3$ voxels.

In some implementations, the third volume of voxels can include a volume of $16^3$ voxels.

In some implementations, determining, based on the first output data, the second output data, and the third output data whether the obtained first image depicts a tumor can include classifying each voxel in the first image as either normal or abnormal based on the first output data, the second output data, and the third output data, and generating a graph structure that represents each voxel in the first image as a node with an edge between each adjacent voxel.

In some implementations, the operations can further include: identifying sets of connected voxels based on the nodes and edges of the graph structure, and determining that a particular set of the identified sets of connected voxels is likely to be a tumor if the particular set of connected voxels includes more than a threshold number of predicted tumor voxels.

These and other aspects of the present disclosure are discussed in more detail in the detailed description below with reference to the accompanying drawings.

DETAILED DESCRIPTION

According to one innovative aspect of the present disclosure, a system and method for analyzing images of organs to determine whether the image includes a plurality of voxels representing a tumor is disclosed. In some implementations, the system and method can be configured to analyze images of organs to determine whether the image includes a plurality of voxels representing pancreatic ductal adenocarcinoma (PDAC). However, the present disclosure need not be so limited, and instead, can be applied to find tumors depicted, by an image, on other organs of an entity's body. The image can include a CT image and the entity can include a human.

The system and methods of the present disclosure solve a particular problem known in the field related to the detection of small tumors such as PDAC tumors on small organs such as the pancreas. Specifically, conventional systems cannot perform analysis of images of organs to identify such small tumors because of the small size of the tumors. To solve this problem of detecting small tumors, the present disclosure uses a coarse-to-fine segmentation that includes a multi-stage fine analysis of a region of interest of an image depicting at least a portion of one or more organs. The multi-stage fine analysis can detect small tumors such as PDAC tumors by distinguishing a plurality of voxels of an image that represents one or more small tumors from a plurality of voxels that represent all, or a portion of, a small organ such as a pancreas.

Figure 1:
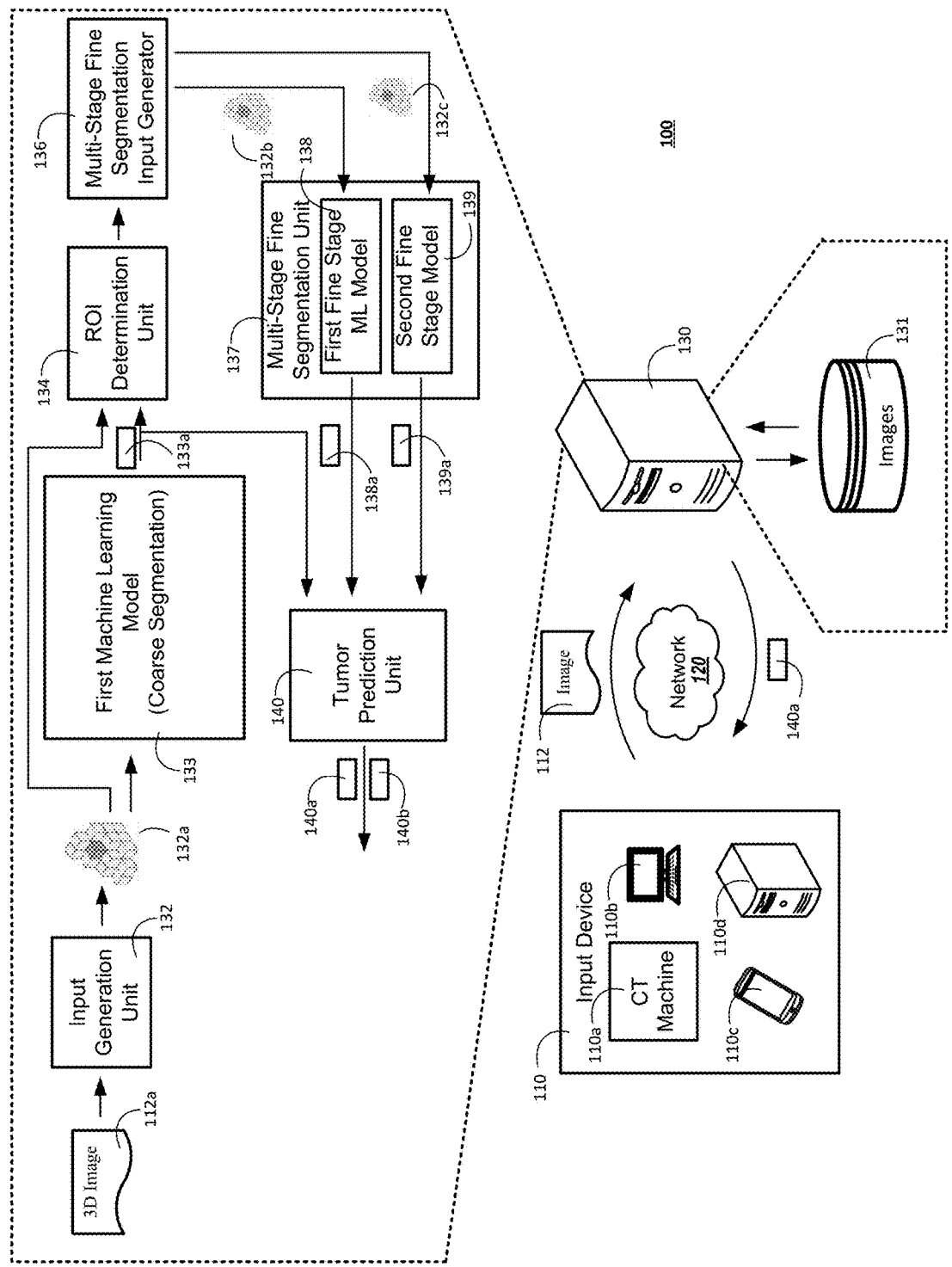
FIG. 1 is a block diagram of an example of a system for using multi-scale coarse-to-fine segmentation of images to detect pancreatic ductal adenocarcinoma (PDAC).

FIG. 1 is a block diagram of an example of a system 100 using multi-scale coarse-to-fine segmentation of images to detect pancreatic ductal adenocarcinoma (PDAC). The system 100 includes an input device 110, a network 120, and a computer 130. The computer 130 can include an input generation unit 132, a first machine learning model 133 for performing coarse segmentation, a region of interest determination unit 134, a multi-stage fine segmentation input generator unit 136, a multi-stage fine segmentation unit 137, and a tumor prediction unit 140. In some implementations, the computer 130 can be a server computer. For purposes of the present disclosure, a "unit" can include one or more software modules, one or more hardware modules, or a combination of one or more software modules and one or more hardware modules.

The input device 110 can include any device that is configured to generate an image of one or more organs of an entity's body, a device that is configured to provide a generated image of one or more organs of an entity's body, or any combination thereof. By way of example, the input device 110 can include a CT machine 110a that is configured to generate CT images of one or more organs of an entity's body. In some implementations, such a CT machine 110a can generate the CT image 112 and transmit the CT image 112 to another computer such as server 130 across a network 120. Alternatively, the CT machine 110a can generate a CT image 112 that can be accessed by one or more other input devices 110 such as computer 110b (e.g., desktop, laptop, tablet, etc.), a smartphone 110c, or a server 110d. In such instances, the one or more other input devices 110b, 110c, 110d can access the CT image 112 generated by the CT machine and transmit the accessed image to the computer 130 using the network 120. The network 120 can include one or more of a wired Ethernet network, a wired optical network, a wireless WiFi network, a LAN, a WAN, a Bluetooth network, a cellular network, the Internet, or any combination thereof. Though examples of the present disclosure described herein refer to a CT Machine 110a and a CT image, the present disclosure is not so limited. Instead, the present disclosure can include machine learning models (e.g., one or more neural networks) that have been trained to detect tumor in any type of image. Such images can include two-dimensional images, three-dimensional images, image models generated based on another image, or the like. Such images may include, for example, images of organs generated by other imaging devices such as a magnetic resonance imaging (MRI) device, a single photon emission computed tomography (SPECT) imaging device, or a positron emission tomography (PET) imaging machine.

The computer 130 is configured to obtain one or more images generated by an input device 110 such as a CT machine 110a. In some implementations, the one or more images can be an image received over the network 120. In other implementations, the computer 130 can access images stored in a database 131 that is accessible to the computer 130. The database 131 can be a local database or a cloud-based database.

The computer 130 can provide an obtained image such as image 112 to an input generation unit 132. In some implementations, the computer 130 can provide the obtained image 112 for input to the input generation unit 132 in the same format the image 112 was in when the image 112 was received. For example, in some implementations, the computer 130 can receive a two-dimensional CT image and provide the two-dimensional CT image as an input to the input generation unit 132. In other implementations, such as the implementation described with reference to FIG. 1, the computer 130 can process one or more images 112 to generate a three-dimensional image 112a. In such implementations, the three-dimensional image 112a can be input into the input generation unit 132. In yet other implementations, the computer 130 can obtain a three-dimensional image and provide the three dimensional image as an input to the input generation unit 132 without taking steps to generate a three-dimensional image from multiple two-dimensional images.

The input generation unit 132 can generate image data 132a for input to the first machine learning model 133 that is configured to perform coarse segmentation. In the example of FIG. 1, the input generation unit 132 receives, as input, a three-dimensional image 112a. In this example, the image data 132a generated by the input generation unit 132 can include a data structure that structures data representing a voxel model 132a of the image 112a. However, the present disclosure is not so limited. In implementations, where the input image is a two-dimensional image, the image data generated by input generation unit 132 can be a data structure that structures data representing a bitmap of the two dimensional image. The image data 132a that is output by the input generation model can be provided as input to the first machine learning model 133. In the example of FIG. 1, the image data 132a is a data structure used to represent a first voxel model of the three-dimensional image 112a using a first volume of voxels such as $64^3$ voxels.

The first machine learning model can be trained to perform coarse segmentation on the image data to detect a tumor. For example, the machine learning model can be trained to distinguish between tumor voxels and non-tumor voxels, and then output, based on a number of tumor voxels detected, a likelihood 133a that at a least a portion of the image data 132a represents a tumor. In some implementations, such training can be achieved using a simulator to generate training labels for training images that indicate whether each voxel of the training image is a tumor voxel or a non-tumor voxel. In such implementations, each training image can be provided as an input to the first machine learning model 133, processed by the first machine learning model 133, and then training output generated by the first machine learning model 133 can be used to determine a predicted label for each voxel of the training image. The predicted label for each voxel can be compared to each training label. Then, the parameters of the first machine learning model can be adjusted based on differences between the predicted labels and the training labels. This iterative process can continue for each of a plurality of training images until predicted voxel labels produced by the first machine learning model 133 for a training image match, within a predetermined level of error, training labels generated by the simulator for the training images. Accordingly, output for a trained first machine learning model 133 that processes the input image data 132*a* can include a labeled image 133*a* includes labels, for each voxel, indicating whether each voxel is a tumor voxel or a non-tumor voxel. In some implementations, the likelihood 133*a* can include a ratio of voxel tumors to non-voxel tumors.

However, the present disclosure is not so limited. Instead, in some implementations, the first machine learning model 133 can also, or alternatively, be trained to predict a label for each voxel that indicate whether each voxel of the image data 132*a* processed by the first machine learning model 133 is likely a tumor voxel or an organ voxel. In some implementations, the first machine learning model 133 can include a neural network.

The region of interest determination unit 134 can be configured to identify a region of interest of the image data 132*a* based on the coarse segmentation analysis performed by the first machine learning model 133. The region of interest can be a bounding box of at least a portion of the image data 132*a* that warrants further analysis by the multistage fine segmentation unit 137. In some implementations, the region of interest can be determined based on a set of voxels identified during coarse segmentation as being related to an organ such as a pancreas. In some implementations, the region of interest can include a predetermined number of voxels surrounding a plurality of voxels representing an organ such as the pancreas. A portion of the image data 132*a* that corresponds to the determined region of interest can be output by the region of interest determination unit 134 and input to the multi-stage fine segmentation input generator unit 136.

The multi-stage fine segmentation input generator 136 can generate additional image data for input into each stage of the multi-stage fine segmentation unit 137. In the example of FIG. 1, the multi-stage fine segmentation unit includes two fine stages 138, 139. Accordingly, the multi-stage fine segmentation input generator unit can generate two additional sets of image data such as image data 132*b* having a second volume of voxels that is less than image data 132*a*'s first volume of voxels and image data 132*c* having a third volume of voxels that is less than 132*b*'s second volume of voxels. By way of example, the second volume of voxels can include $32^3$ voxels and the third volume of voxels can include $16^3$ voxels.

The first fine stage machine learning model 138 can be configured to perform fine segmentation on image data to detect a tumor. For example, the first fine stage machine learning model 138 can be trained to distinguish between tumor voxels and non-tumor voxels for image data 132*b* that includes a second volume of voxels that is less than the first volume of voxels, and then output, based on a number of tumor voxels detected, a likelihood 138*a* that at a least a portion of the image data represents a tumor. The first fine stage machine learning model 138 can be trained in a manner similar to that described above with respect to the first machine learning model 133. However, the first fine stage machine learning model 138 is trained on training images of a second voxel volume such as $32^3$ voxels, whereas the first machine learning model 133 is trained on training images of a first voxel volume such as $64^3$ voxels. Once the output is generated by the first fine stage ML model, the number of labels for each voxel label category can be summed and compared to each other or to one or more thresholds. In some implementations, the data output by the first fine stage machine learning model 138 can also include data that labels each voxel of the image data as likely being a tumor voxel or an organ voxel. In some implementations, the second volume of voxels can include $32^3$ voxels. In some implementations, the likelihood 138*a* can include a ratio of voxel tumors to non-voxel tumors.

The second fine stage machine learning model 139 can be configured to perform fine segmentation on the image data to detect a tumor. For example, the first fine stage machine learning model 139 can be trained to distinguish between tumor voxels and non-tumor voxels for image data 132*c* that includes a third volume of voxels that is less than the second volume of voxels, and then output, based on a number of tumor voxels detected, a likelihood 139*a* that at a least a portion of the image data represents a tumor. The second fine stage machine learning model 139 can be trained in a manner similar to that described above with respect to the first machine learning model 133 and the first fine stage machine learning model 138. However, the second fine stage machine learning model 139 is trained on training images of a third voxel volume such as $16^3$ voxels, whereas the first machine learning model 133 is trained on training images of a first voxel volume such as $64^3$ voxels and the second machine learning model is trained on training images of a second voxel volume such as $32^3$ voxels. Once the output is generated by the second fine stage ML model, the number of labels for each voxel label category can be summed and compared to each other or to one or more thresholds. In some implementations, the data output by the second fine stage machine learning model 139 can also include data that labels each voxel of the third image data 132*c* as likely being a tumor voxel or an organ voxel. In some implementations, the third volume of voxels can include $16^3$ voxels. In some implementations, the likelihood 139*a* can include a ratio of voxel tumors to non-voxel tumors.

The tumor prediction unit 140 can be configured to determine whether the image 112*a* includes a plurality of voxels that represent a tumor. In some implementations, the tumor prediction unit 140 can be configured to make this determination based on the first output data from the coarse segmentation unit 133, the second output data 138*a* output by the multi-stage fine segmentation unit 137, and the third output data 139*a* output by the multi-stage fine segmentation unit 137. By way of example, the tumor prediction unit 140 can determine an average of the first likelihood 133*a* that the image data 132*a* includes a plurality of voxels representing a tumor, the second likelihood 138*a* that the image data 132*b* includes a plurality of voxels representing a tumor, and the third likelihood 139*a* that the image data 132*c* includes a plurality of voxels representing a tumor. In such implementation, if the average of these likelihoods from the coarse segmentation unit 133 and the multi-stage fine segmentation unit 137 satisfies a predetermined threshold, then the tumor prediction unit 140 can generate output data 140*a* indicating that it is likely that the three-dimensional image 112*a* depicts a tumor. If, however, the average of these likelihoods from the coarse segmentation unit 133 and the multi-stage fine segmentation unit 137 does not satisfy a predetermined threshold, then the tumor prediction unit 140 can generate output data 140*b* indicating that it is not likely that the three-dimensional image 112*a* depicts a tumor.

In some implementations, the computer 130 can generate rendering data that, when rendered by a device having a display such as a computer 110*b* or smartphone 110*c*, can cause the device to output data indicating whether or not the three-dimensional image 112*a* depicts a tumor. Such rendering data can be transmitted, by the computer 130, to the device that includes the display using one or more networks 120 and processed by the receiving device to generate output data that indicates, to a user, whether or not the three-dimensional image 112a depicts a tumor. In some implementations, a display device can be coupled to the computer 130. In such instances, the rendered data can be processed by the computer 130, and cause the computer 130 to output data that indicates, to a user, whether or not the three-dimensional image 112a depicts a tumor.

Aspects of the present disclosure were described with respect to use of a multiple machine learning model trained to process sets of image data that each described a voxel model for an input three-dimensional image. However, the present disclosure is not so limited. Instead, the present disclosure can also be used to analyze two-dimensional images to determine whether the image depicts a tumor. In such implementations, the image data 132a, 132b, 132c can include bitmap models and each of the machine learning models 133, 138, 139 can be trained to process the bitmap models, predict whether each pixel represented in the bitmap represents a tumor pixel or an organ pixel, and then determine, based on the number of tumor pixels, a likelihood that at least a portion of the input image data represents a tumor.

Figure 2:
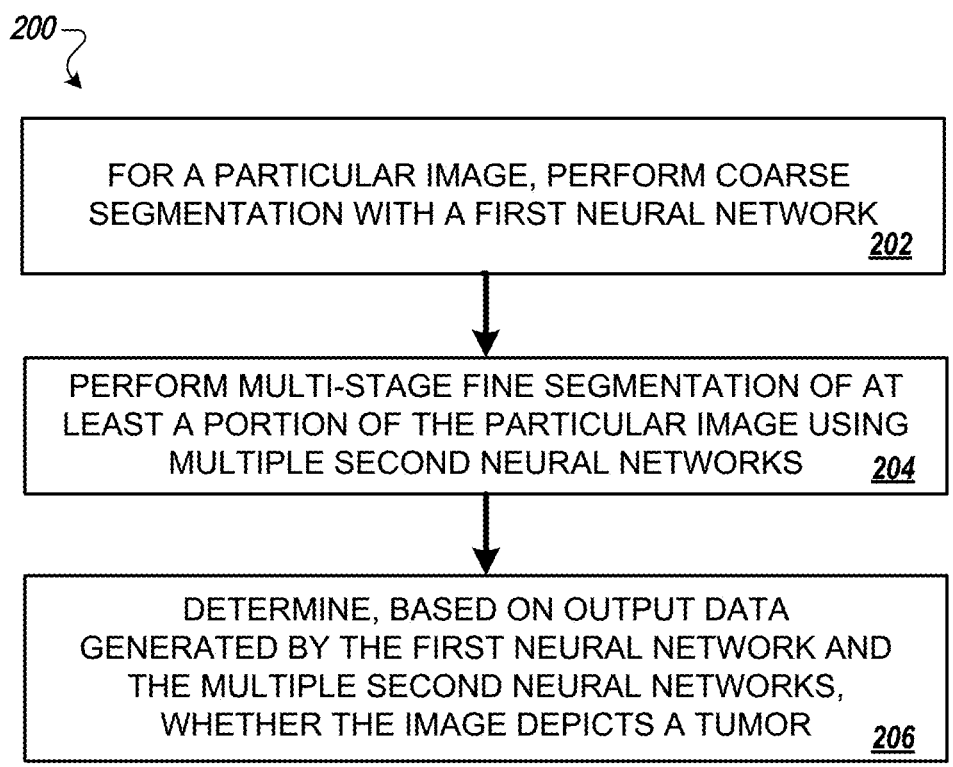
FIG. 2 is a flowchart of an example of a process for multi-scale coarse-to-fine segmentation of images to detect PDAC.

FIG. 2 is a flowchart of an example of a process 200 for multi-scale coarse-to-fine segmentation of images to detect PDAC. In general, the process 200 can include for a particular image, performing coarse segmentation with a first neural network (202), performing multi-stage fine segmentation of at least a portion of the particular image using multiple second neural networks (204), and determining, based on output data generated by the first neural network and the multiple second neural networks, whether the image depicts a tumor (206).

Figure 3:
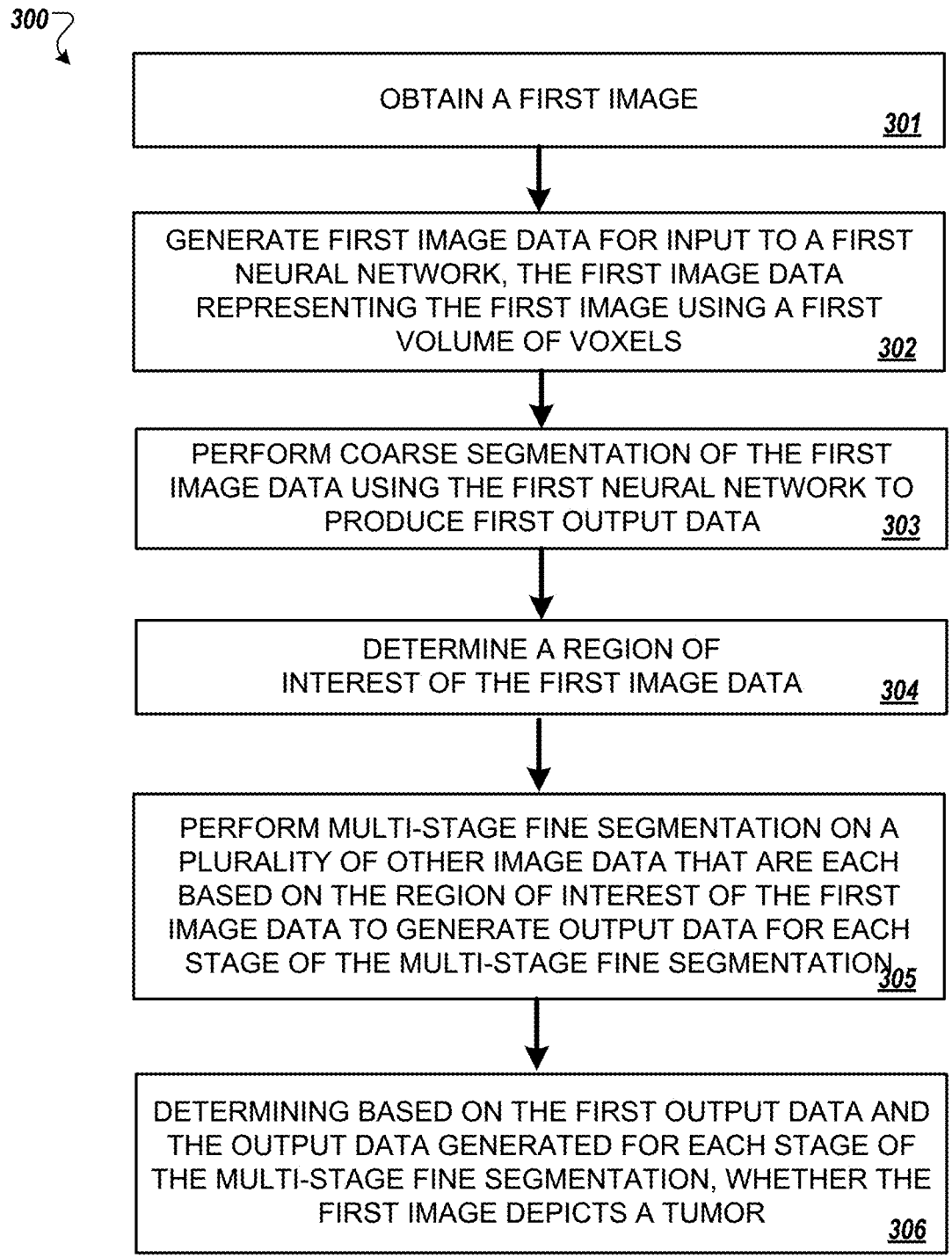
FIG. 3 is a flowchart of an example of another process for multiscale coarse-to-fine segmentation of images to detect PDAC.

FIG. 3 is a flowchart of an example of another process 300 for multiscale coarse-to-fine segmentation of images to detect PDAC. In general, the process 300 includes obtaining a first image (301), generating first image data, for input to a first neural network, where the first image data represents the first image using a first volume of voxels (302), performing coarse segmentation of the first image data using the first neural network to produce first output data indicating a likelihood that the first image depicts a tumor (303), determining a region of interest of the first image data (304), performing multi-stage fine segmentation on a plurality of other image data that are each based on the region of interest of the first image data to generate output data for each stage of the multi-stage fine segmentation (305), and determining, based on the first output data generated for each stage of the multi-stage fine segmentation, whether the first image depicts tumor (306).

Figure 4:
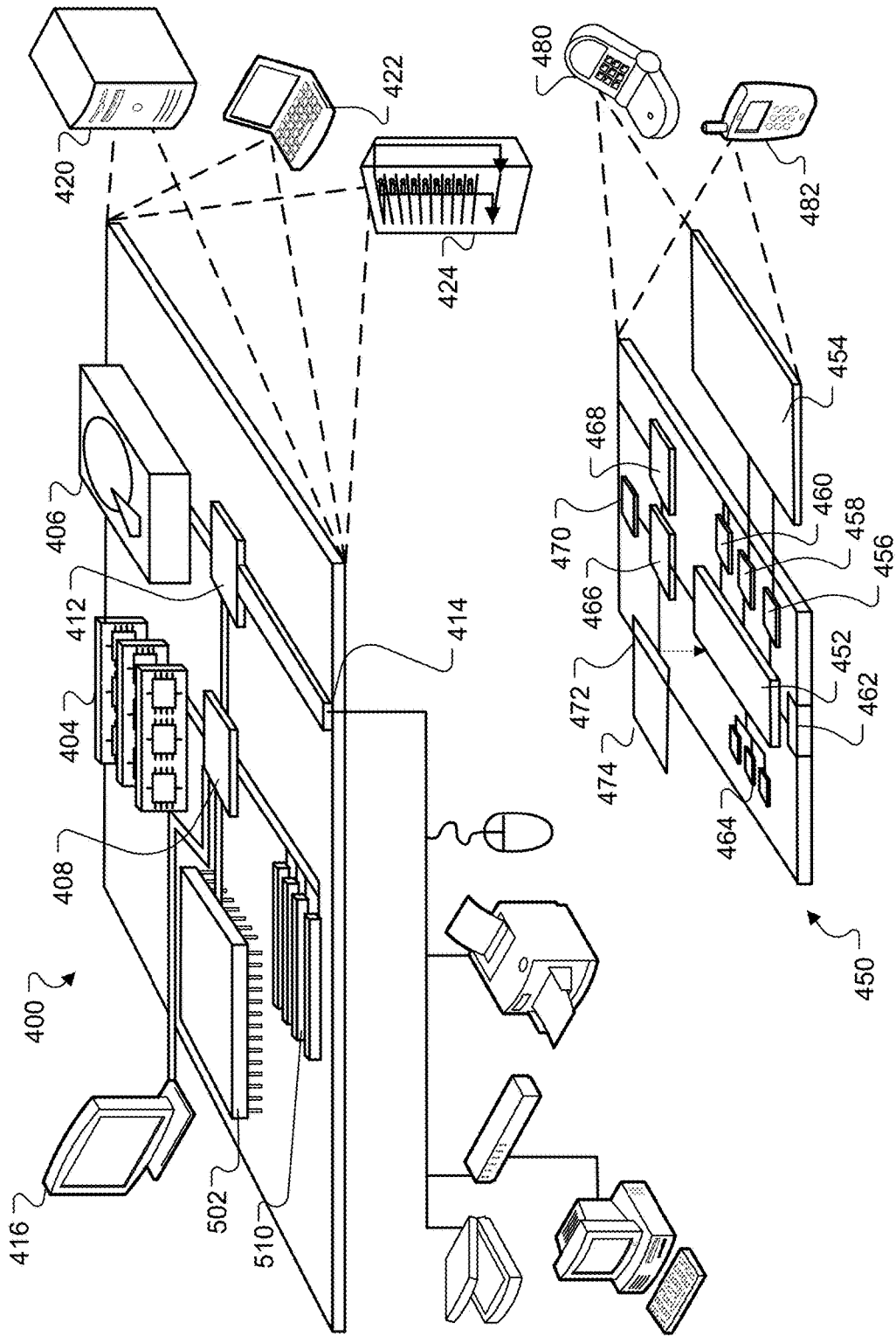
FIG. 4 is an example of a block diagram of system components that can be used to implement a system for multi-scale coarse-to-fine segmentation of images to detect (PDAC).

FIG. 4 is an example of a block diagram of system components that can be used to implement a system for multi-scale coarse-to-fine segmentation of images to detect (PDAC).

Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally, computing device 400 or 450 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 408, a high-speed interface 408 connecting to memory 404 and high-speed expansion ports 410, and a low speed interface 412 connecting to low speed bus 414 and storage device 408. Each of the components 402, 404, 408, 408, 410, and 412, are interconnected using various busses, and can be mounted on a common motherboard or in other manners as appropriate. The processor 402 can process instructions for execution within the computing device 400, including instructions stored in the memory 404 or on the storage device 408 to display graphical information for a GUI on an external input/output device, such as display 416 coupled to high speed interface 408. In other implementations, multiple processors and/or multiple buses can be used, as appropriate, along with multiple memories and types of memory. Also, multiple computing devices 400 can be connected, with each device providing portions of the necessary operations, e.g., as a server bank, a group of blade servers, or a multi-processor system.

The memory 404 stores information within the computing device 400. In one implementation, the memory 404 is a volatile memory unit or units. In another implementation, the memory 404 is a non-volatile memory unit or units. The memory 404 can also be another form of computer-readable medium, such as a magnetic or optical disk.

The storage device 408 is capable of providing mass storage for the computing device 400. In one implementation, the storage device 408 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 404, the storage device 408, or memory on processor 402.

The high speed controller 408 manages bandwidth-intensive operations for the computing device 400, while the low speed controller 412 manages lower bandwidth intensive operations. Such allocation of functions is exemplary only. In one implementation, the high-speed controller 408 is coupled to memory 404, display 416, e.g., through a graphics processor or accelerator, and to high-speed expansion ports 410, which can accept various expansion cards (not shown). In the implementation, low-speed controller 412 is coupled to storage device 408 and low-speed expansion port 414. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 400 can be implemented in a number of different forms, as shown in the figure. For example, it can be implemented as a standard server 420, or multiple times in a group of such servers. It can also be implemented as part of a rack server system 424. In addition, it can be implemented in a personal computer such as a laptop computer 422. Alternatively, components from computing device 400 can be combined with other components in a mobile device (not shown), such as device 450. Each of such devices can contain one or more of computing device 400, 450, and an entire system can be made up of multiple computing devices 400, 450 communicating with each other.

The computing device 400 can be implemented in a number of different forms, as shown in the figure. For example, it can be implemented as a standard server 420, or multiple times in a group of such servers. It can also be implemented as part of a rack server system 424. In addition, it can be implemented in a personal computer such as a laptop computer 422. Alternatively, components from computing device 400 can be combined with other components in a mobile device (not shown), such as device 450. Each of such devices can contain one or more of computing device 400, 450, and an entire system can be made up of multiple computing devices 400, 450 communicating with each other.

Computing device 450 includes a processor 452, memory 464, and an input/output device such as a display 454, a communication interface 466, and a transceiver 468, among other components. The device 450 can also be provided with a storage device, such as a micro-drive or other device, to provide additional storage. Each of the components 450, 452, 464, 454, 466, and 468, are interconnected using various buses, and several of the components can be mounted on a common motherboard or in other manners as appropriate.

The processor 452 can execute instructions within the computing device 450, including instructions stored in the memory 464. The processor can be implemented as a chipset of chips that include separate and multiple analog and digital processors. Additionally, the processor can be implemented using any of a number of architectures. For example, the processor 410 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 450, such as control of user interfaces, applications run by device 450, and wireless communication by device 450.

Processor 452 can communicate with a user through control interface 458 and display interface 456 coupled to a display 454. The display 454 can be, for example, a TFT (Thin-Film-Transistor Liquid Crystal Display) display or an OLED (Organic Light Emitting Diode) display, or other appropriate display technology. The display interface 456 can comprise appropriate circuitry for driving the display 454 to present graphical and other information to a user. The control interface 458 can receive commands from a user and convert them for submission to the processor 452. In addition, an external interface 462 can be provide in communication with processor 452, so as to enable near area communication of device 450 with other devices. External interface 462 can provide, for example, for wired communication in some implementations, or for wireless communication in other implementations, and multiple interfaces can also be used.

The memory 464 stores information within the computing device 450. The memory 464 can be implemented as one or more of a computer-readable medium or media, a volatile memory unit or units, or a non-volatile memory unit or units. Expansion memory 474 can also be provided and connected to device 450 through expansion interface 472, which can include, for example, a SIMM (Single In Line Memory Module) card interface. Such expansion memory 474 can provide extra storage space for device 450, or can also store applications or other information for device 450. Specifically, expansion memory 474 can include instructions to carry out or supplement the processes described above, and can include secure information also. Thus, for example, expansion memory 474 can be provide as a security module for device 450, and can be programmed with instructions that permit secure use of device 450. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that can be received, for example, over transceiver 468 or external interface 462.

Device 450 can communicate wirelessly through communication interface 466, which can include digital signal processing circuitry where necessary. Communication interface 466 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 468. In addition, short-range communication can occur, such as using a Bluetooth, Wi-Fi, or other such transceiver (not shown). In addition, GPS (Global Positioning System) receiver module 470 can provide additional navigation- and location-related wireless data to device 450, which can be used as appropriate by applications running on device 450.

Device 450 can also communicate audibly using audio codec 460, which can receive spoken information from a user and convert it to usable digital information. Audio codec 460 can likewise generate audible sound for a user, such as through a speaker, e.g., in a handset of device 450. Such sound can include sound from voice telephone calls, can include recorded sound, e.g., voice messages, music files, etc. and can also include sound generated by applications operating on device 450.

The computing device 450 can be implemented in a number of different forms, as shown in the figure. For example, it can be implemented as a cellular telephone 480. It can also be implemented as part of a smartphone 482, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A data processing apparatus for processing images through a system of one or more neural networks to detect a pancreatic ductal adenocarcinoma (PDAC), the data processing apparatus including one or more processors and one or more computer readable storage media storing instructions, that when executed by the one or more processors, causes the one or more processors to perform operations, the operations comprising:
   obtaining a first image;
   performing coarse segmentation of the first image using a first neural network trained to produce first output data representing a first likelihood that the first image includes more than a threshold number of voxels that depict a tumor;
   determining a region of interest of the first image based on the coarse segmentation;
   performing multi-stage fine segmentation using a plurality of images that are each generated based on the region of interest of the first image, comprising:
      performing a first fine stage segmentation of a second image generated based on the region of interest of the first image using a second neural network trained to produce second output data representing a second likelihood that the second image includes more than a threshold number of voxels that depict a tumor; and
      performing a second fine stage segmentation of a third image generated based on the region of interest of the first image using a third neural network trained to produce third output data representing a third likelihood that the third image includes more than a threshold number of voxels that depict a tumor; and
   determining, based on the first output data, the second output data, and the third output data whether the obtained first image depicts a tumor.

2. The data processing apparatus of claim 1, wherein the first image, the second image, and the third image are each CT images.

3. The data processing apparatus of claim 1, wherein determining based on the first output data, the second output data, and the third output data whether the first image depicts a tumor comprises:
   determining average data that represents an average of the first likelihood, the second likelihood, and the third likelihood; and
   determining whether the average data satisfies a predetermined threshold.

4. The data processing apparatus of claim 3, wherein the operations further comprise:
   based on determining that the average data satisfies the predetermined threshold, determining that the first image depicts a tumor.

5. The data processing apparatus of claim 3, wherein the operations further comprise:
   based on determining that the average data does not satisfy the predetermined threshold, determining that the first image does not depict a tumor.

6. The data processing apparatus of claim 1, wherein determining, based on the first output data, the second output data, and the third output data whether the obtained first image depicts a tumor comprises:
   classifying each voxel in the first image as either normal or abnormal based on the first output data, the second output data, and the third output data; and
   generating a graph structure that represents each voxel in the first image as a node with an edge between each adjacent voxel.

7. The data processing apparatus of claim 6, the operations further comprising:
   identifying sets of connected voxels based on the nodes and edges of the graph structure; and
   determining that a particular set of the identified sets of connected voxels is likely to be a tumor if the particular set of connected voxels includes more than a threshold number of predicted tumor voxels.

8. A method comprising:
   obtaining a first image;
   performing coarse segmentation of the first image using a first neural network trained to produce first output data representing a first likelihood that the first image includes more than a threshold number of voxels that depict a tumor;

determining a region of interest of the first image based on the coarse segmentation;

performing multi-stage fine segmentation using a plurality of images that are each generated based on the region of interest of the first image, comprising:

performing a first fine stage segmentation of a second image generated based on the region of interest of the first image using a second neural network trained to produce second output data representing a second likelihood that the second image includes more than a threshold number of voxels that depict a tumor; and performing a second fine stage segmentation of a third image generated based on the region of interest of the first image using a third neural network trained to produce third output data representing a third likelihood that the third image includes more than a threshold number of voxels that depict a tumor; and determining, based on the first output data, the second output data, and the third output data whether the obtained first image depicts a tumor.

9. The method of claim 8, wherein determining based on the first output data, the second output data, and the third output data whether the first image depicts a tumor comprises:

determining average data that represents an average of the first likelihood, the second likelihood, and the third likelihood; and determining whether the average data satisfies a predetermined threshold.

10. The method of claim 9, wherein the method further comprises:

based on determining that the average data satisfies the predetermined threshold, determining that the first image depicts a tumor.

11. The method of claim 9, wherein the method further comprises:

based on determining that the average data does not satisfy the predetermined threshold, determining that the first image does not depict a tumor.

12. The method of claim 8, wherein determining, based on the first output data, the second output data, and the third output data whether the obtained first image depicts a tumor comprises:

classifying each voxel in the first image as either normal or abnormal based on the first output data, the second output data, and the third output data; and generating a graph structure that represents each voxel in the first image as a node with an edge between each adjacent voxel.

13. The method of claim 12, the method further comprises:

identifying sets of connected voxels based on the nodes and edges of the graph structure; and determining that a particular set of the identified sets of connected voxels is likely to be a tumor if the particular set of connected voxels includes more than a threshold number of predicted tumor voxels.

14. A computer-readable storage device having stored thereon instructions, which, when executed by data processing apparatus, cause the data processing apparatus to perform operations, the operations comprising:

obtaining a first image;

performing coarse segmentation of the first image using a first neural network trained to produce first output data representing a first likelihood that the first image includes more than a threshold number of voxels that depict a tumor;

determining a region of interest of the first image based on the coarse segmentation;

performing multi-stage fine segmentation using a plurality of images that are each generated based on the region of interest of the first image, comprising:

performing a first fine stage segmentation of a second image generated based on the region of interest of the first image using a second neural network trained to produce second output data representing a second likelihood that the second image includes more than a threshold number of voxels that depict a tumor; and performing a second fine stage segmentation of a third image generated based on the region of interest of the first image using a third neural network trained to produce third output data representing a third likelihood that the third image includes more than a threshold number of voxels that depict a tumor; and determining, based on the first output data, the second output data, and the third output data whether the obtained first image depicts a tumor.

15. The computer-readable storage device of claim 14, wherein determining based on the first output data, the second output data, and the third output data whether the first image depicts a tumor comprises:

determining average data that represents an average of the first likelihood, the second likelihood, and the third likelihood; and determining whether the average data satisfies a predetermined threshold.

16. The computer-readable storage device of claim 15, wherein the operations further comprise:

based on determining that the average data satisfies the predetermined threshold, determining that the first image depicts a tumor, or based on determining that the average data does not satisfy the predetermined threshold, determining that the first image does not depict a tumor.

17. The computer-readable storage device of claim 14, wherein determining, based on the first output data, the second output data, and the third output data whether the obtained first image depicts a tumor comprises:

classifying each voxel in the first image as either normal or abnormal based on the first output data, the second output data, and the third output data; and generating a graph structure that represents each voxel in the first image as a node with an edge between each adjacent voxel.

18. The computer-readable storage device of claim 17, the operations further comprising:

identifying sets of connected voxels based on the nodes and edges of the graph structure; and determining that a particular set of the identified sets of connected voxels is likely to be a tumor if the particular set of connected voxels includes more than a threshold number of predicted tumor voxels.

* * * * *